March 26, 1929.  G. LOECK  1,706,930
OPTICAL SYSTEM
Filed Aug. 8, 1928
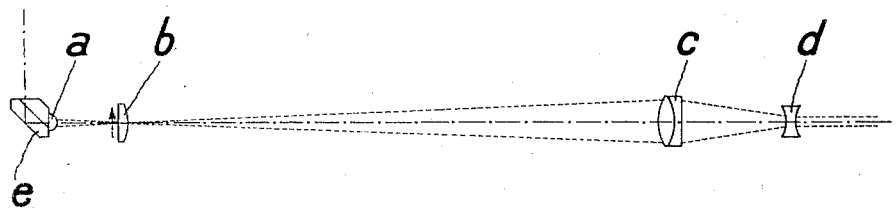
Inventor:

Patented Mar. 26, 1929.

1,706,930

UNITED STATES PATENT OFFICE.

GÜNTHER LOECK, OF BERLIN, GERMANY, ASSIGNOR TO THE FIRM GEORG WOLF G. M. B. H., OF BERLIN, GERMANY.

OPTICAL SYSTEM.

Application filed August 8, 1928, Serial No. 298,297, and in Germany September 2, 1927.

The present invention relates to a new optical system for installation in urethroscopes, cystoscopes and in apparatus available for examination of the interior of narrow tubes etc., in which the reversing systems heretofore necessary between objective and eyepiece are dispensed with, thus resulting in a simple system which however is fully sufficient in many cases.

The new system, according to the invention, consists of a short-focus objective system followed by a field lens, and at a greater distance in back of it by a Galilean telescope serving as an ocular which latter is arranged in such a way as to have its positive member face the objective system. This system of lenses if used in conjunction with the ordinary roof prism in front of the objective, as usually employed in cystoscopes and in similar instruments, produces upright and laterally correct images.

The annexed drawing shows a constructional example of a system according to the present invention as in conjunction with a roof prism. The system as drawn consists of an objective $a$ followed by a field lens $b$, and by a Galilean telescope—serving as an ocular—consisting of lenses $c$ and $d$. In front of the objective a roof prism $e$ is located.

As may be seen, the installation of such system into a mounting tube would be comparatively simple.

I claim:

1. Optical system available for the observation of articles through a comparatively long and narrow tube consisting of a short-focus objective system, in back of which is arranged a field lens, and a Galilean telescope, the latter consisting of a positive member and of a negative member—the positive member facing the said objective system—, and the Galilean telescope being located at a large distance in the rear of the said field lens.

2. Optical system available for the observation of articles through a comparatively long and narrow tube consisting of a short-focus objective system, in back of which is arranged a field lens, and a Galilean telescope, the latter consisting of a positive member and of a negative member—the positive member facing the said objective system—and the Galilean telescope being located in the rear of the said field lens at a distance which is several times as large as the distance between the field lens from the objective system.

GÜNTHER LOECK.